(12) United States Patent
Linke et al.

(10) Patent No.: US 8,038,429 B2
(45) Date of Patent: Oct. 18, 2011

(54) DEVICE FOR PRODUCING BLOW MOLD SEGMENTS

(75) Inventors: Michael Linke, Hamburg (DE); Michael Litzenberg, Geesthacht (DE); Rolf Baumgarte, Ahrensburg (DE); Frank Lewin, Tangstedt (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 763 days.

(21) Appl. No.: 11/989,480

(22) PCT Filed: Jul. 17, 2006

(86) PCT No.: PCT/DE2006/001266
§ 371 (c)(1),
(2), (4) Date: Mar. 11, 2008

(87) PCT Pub. No.: WO2007/012308
PCT Pub. Date: Feb. 1, 2007

(65) Prior Publication Data
US 2009/0136613 A1  May 28, 2009

(30) Foreign Application Priority Data

Jul. 25, 2005 (DE) .......................... 10 2005 035 233

(51) Int. Cl.
*B29C 49/48* (2006.01)

(52) U.S. Cl. .......................... 425/195; 425/522; 425/541

(58) Field of Classification Search .................. 425/183, 425/195, 522, 541
See application file for complete search history.

(56) References Cited

U.S. PATENT DOCUMENTS

| 6,113,377 A * | 9/2000 | Clark ............................ 425/195 |
| 6,428,302 B1 * | 8/2002 | Tsau ........................ 425/192 R |
| 6,851,944 B2 * | 2/2005 | Effenberger .................. 425/195 |
| 7,258,538 B2 * | 8/2007 | Miller ........................... 425/182 |

FOREIGN PATENT DOCUMENTS

| DE | 36 13 543 | 12/1986 |
| DE | 39 34 495 | 12/1990 |
| DE | 101 52 050 | 5/2003 |
| DE | 102 61 031 | 3/2005 |

OTHER PUBLICATIONS

Patent Abstracts of Japan, BD. 015, No. 120 (M-1096), March 25, 1991 & JP 03 009830 A (Shatai Kogyo KK), Jan. 17, 1991.

* cited by examiner

*Primary Examiner* — Robert B Davis
(74) *Attorney, Agent, or Firm* — Lucas & Mercanti, LLP; Klaus P. Stoffel (57) ABSTRACT

The device according to the invention serves to retain a blow mould segment in the region of a blow molding station which is provided with a support element for the blow mould segment. The blow mould segment can be detachably fixed in the region of the support element by at least one locking element. The locking element is designed so as to provide both positively locking retention and non-positively locking retention of the blow mould segment.

18 Claims, 14 Drawing Sheets

DEVICE FOR PRODUCING BLOW MOLD SEGMENTS

The invention concerns a device for mounting a blow mold segment in a blowing station, which is provided with a support element for the blow mold segment and in which the blow mold segment can be detachably held in place in the vicinity of the support element by at least one locking element.

In container molding by the action of blowing pressure, preforms made of a thermoplastic material, for example, preforms made of PET (polyethylene terephthalate), are fed to different treatment stations within a blow-molding machine. A blow-molding machine of this type typically has a heating system and a blowing system, in which the preform, which has first been brought to a desired temperature, is expanded into a container by biaxial orientation. The expansion is effected by means of compressed air, which is fed into the preform to be expanded. DE-OS 43 40 291 explains the process-engineering sequence in this type of preform expansion.

The basic design of a blowing station for container molding is described in DE-OS 42 12 583. Possible means of bringing the preform to a desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs include the use of gripping tongs for handling the preforms and the use of expanding mandrels, which can be inserted in the mouth section of the preform to support the preform.

The above-explained handling of the preforms occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are supported in a different way. In stationary blowing stations, which are suitable especially for accommodating several cavities for container molding, plates arranged parallel to one another are typically used as mold supports.

Various methods and devices are known for holding blow mold segments in place in the blowing stations. First of all, direct attachment of the blow mold segments with screws is possible. In addition, snap lock elements are well known and are described, for example, in EP-OS 0 821 641. The use of all of the presently known methods and devices for mounting blow mold segments requires a relatively large amount of labor when the blow mold segments need to be changed. Changing the blow mold segments is necessary, for example, when a product change is being made, so that bottles with a different size or shape can be produced. Changing blow mold segments that are directly attached with screws turns out to be the most labor-intensive. However, even when so-called snap locks are used, a large number of screws must first be loosened and then retightened.

The objective of the present invention is to design a device of the aforementioned type in such a way that handling is made simpler and less time-consuming.

In accordance with the invention, this objective is achieved by virtue of the fact that the locking element is designed to hold the blow mold segment in place with both positive locking and frictional locking.

The construction of the locking element for holding the blow mold segment in place by both positive locking and frictional locking makes it possible to loosen and tighten the locking element in one operation and without the necessity of first loosening and then retightening screw connections. Starting from a locked state, the position of the locking element is changed to remove first the frictional connection and then the positive-locking connection. The blow mold segment can then be removed from the vicinity of the support element and replaced by a different blow mold segment. The locking element is then engaged again to restore first the positive-locking connection and then the frictional connection. The loosening of the locking element, the exchange of the blow mold segment and then the engagement of the locking element again can be carried out in an extremely short time. If the necessary parts are ready and available, it is possible to realize a time of less than a minute for performing the work necessary to change the two mold halves.

It is conducive to secure fastening if the locking element has at least two locking clips for holding the blow mold segment in place.

To allow simple mechanical positioning, it is provided that the locking clips are rigidly connected with each other by a common base element.

The realization of a simple basic mechanical design is aided if the locking element is formed by the base element together with a positioning element.

To realize a well-defined predetermination of kinematic sequences, it is provided that the base element and the guide element are connected with each other with play by at least one connecting element.

It is conducive to a high degree of mechanical stability if the connecting element is designed as a projection that fits into a guide slot.

To provide play in the kinematic connection between the positioning element and the base element, it is proposed that the connecting element be designed as a pin.

To allow a kinematic sequence in both a transverse and a longitudinal direction, the guide slot has an essentially L-shaped configuration.

An especially effective kinematic connection can be achieved by supporting the base element and the positioning element on at least one common guide element.

The possibility of moving the positioning element in a longitudinal direction is provided if the positioning element has a slot by which it is supported on the guide element.

To allow movement of the base element both in the direction of the longitudinal axis and in the direction transverse to the longitudinal axis, it is proposed that the base element have a diagonal slot by which it is supported on the guide element and that the longitudinal direction of the diagonal slot be arranged obliquely to a longitudinal axis of the positioning element.

Simple operation is achieved if the locking element can be positioned by a lever.

To allow the introduction of relatively large actuating forces with a small amount of manual operating force, it is provided that the lever is mounted as a rocker arm.

Ease of operation is enhanced if the lever is designed to be separable from the locking element.

The transformation of small control forces into large actuating forces by means of a favorable mechanical advantage is realized by virtue of the fact that the lever passes through an opening in the positioning element and has an end piece by which it is supported in a recess of the support element.

To help with the frictional connection, it is provided that the base element and the positioning element can be tensioned relative to each other by at least one spring.

To hold the locking element in place in an unlocked position without the application of permanent control forces, it is provided that the locking element can be fixed in place in its unlocked state by at least one catch.

The necessary tensioning operations can be carried out in a simple way by mounting the positioning element in a way that allows it to be tensioned relative to the base element by at least one wedge-shaped surface.

A typical area of application is defined by the fact that the blow mold segment is designed as an inner shell of the mold and the support element is designed as an outer shell of the mold.

It is conducive to a simple basic design if the blow mold segment and the support element are connected with each other in two regions on opposite sides of each other and if the first of the two connections is formed by the locking element and the second of the two connections is formed by at least one rigidly mounted clamping clip.

Specific embodiments of the invention are schematically illustrated in the drawings.

Figure 1:
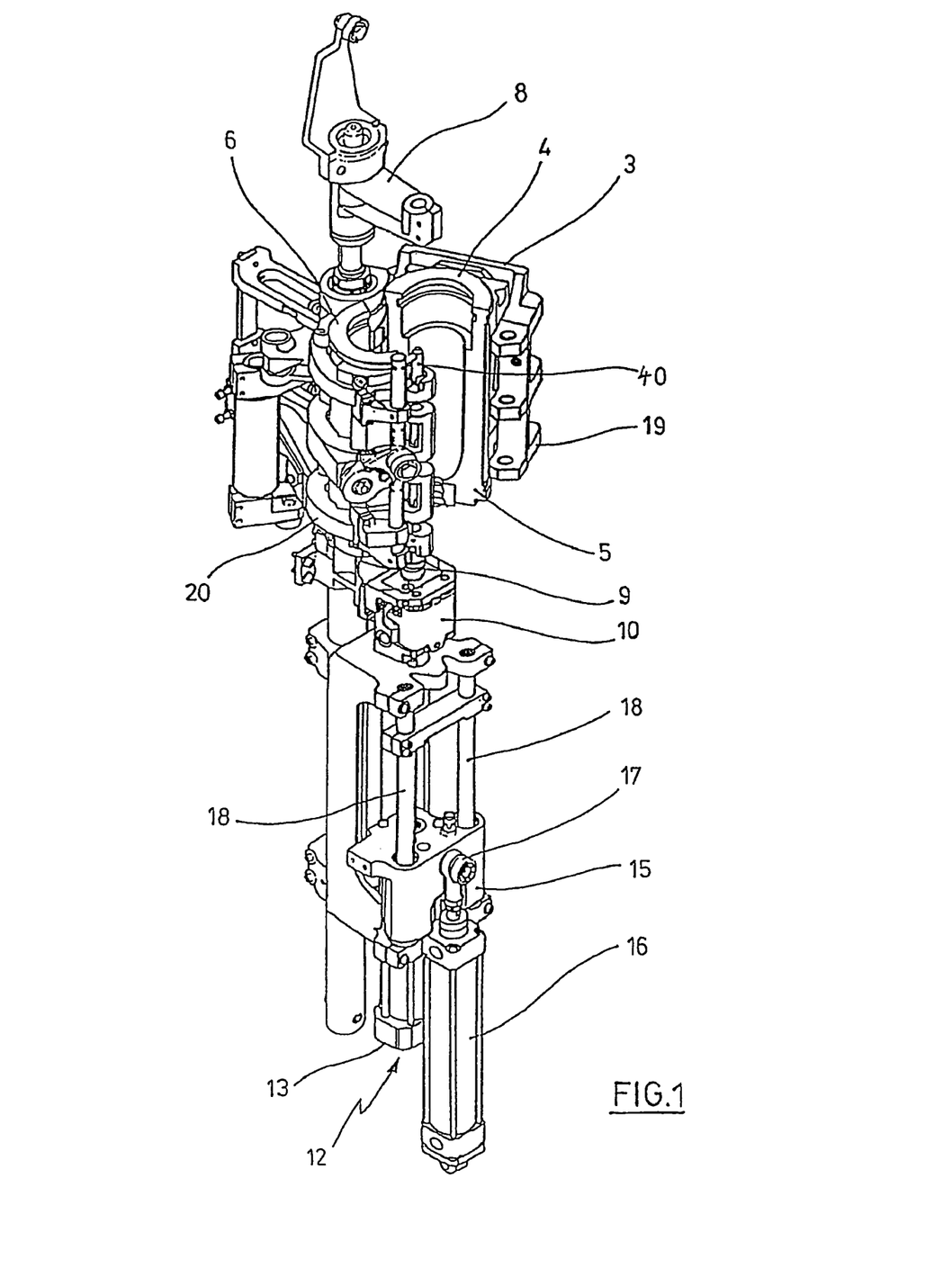
FIG. 1 shows a perspective view of a blowing station for producing containers from preforms.
Figure 2:
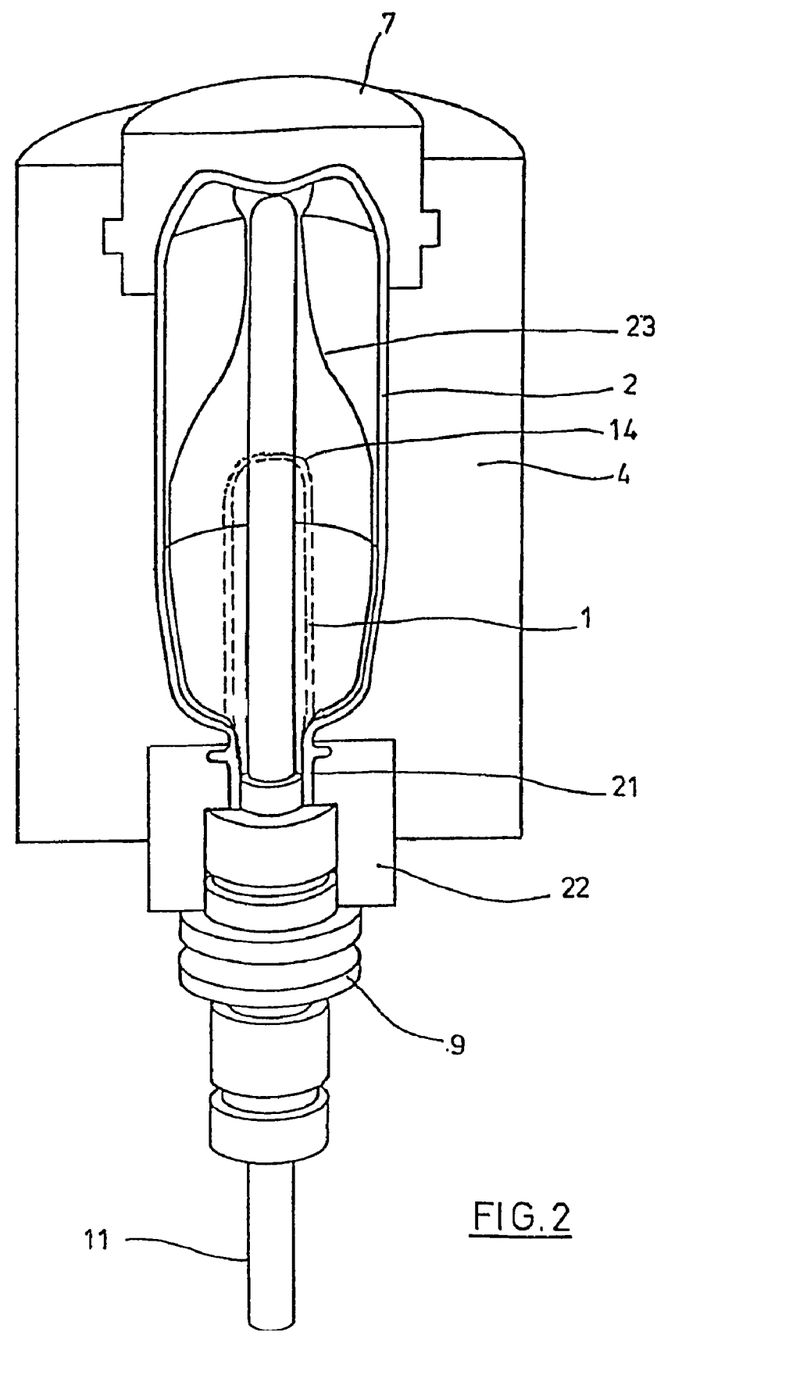
FIG. 2 shows a longitudinal section through a blow mold, in which a preform is stretched and expanded.

FIGS. 1 and 2 show the basic design of a device for shaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in place in the area of the blowing station 3 by a transport mandrel 9, which, together with the preform 1, passes through a large number of treatment stations within the device. However, it is also possible to insert the preform 1 directly into the blow mold 4, for example, with tongs or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

The preform 1 is stretched by means of a stretch rod 11, which is positioned by a cylinder 12. In principle, however, it is also possible to position the stretch rod 11 mechanically by means of cam segments, which are acted upon by pickup rollers. The use of cam segments is advantageous especially when a large number of blowing stations 3 is arranged on a rotating blowing wheel. The use of cylinders 12 is advantageous when stationary blowing stations 3 are provided.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 40.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
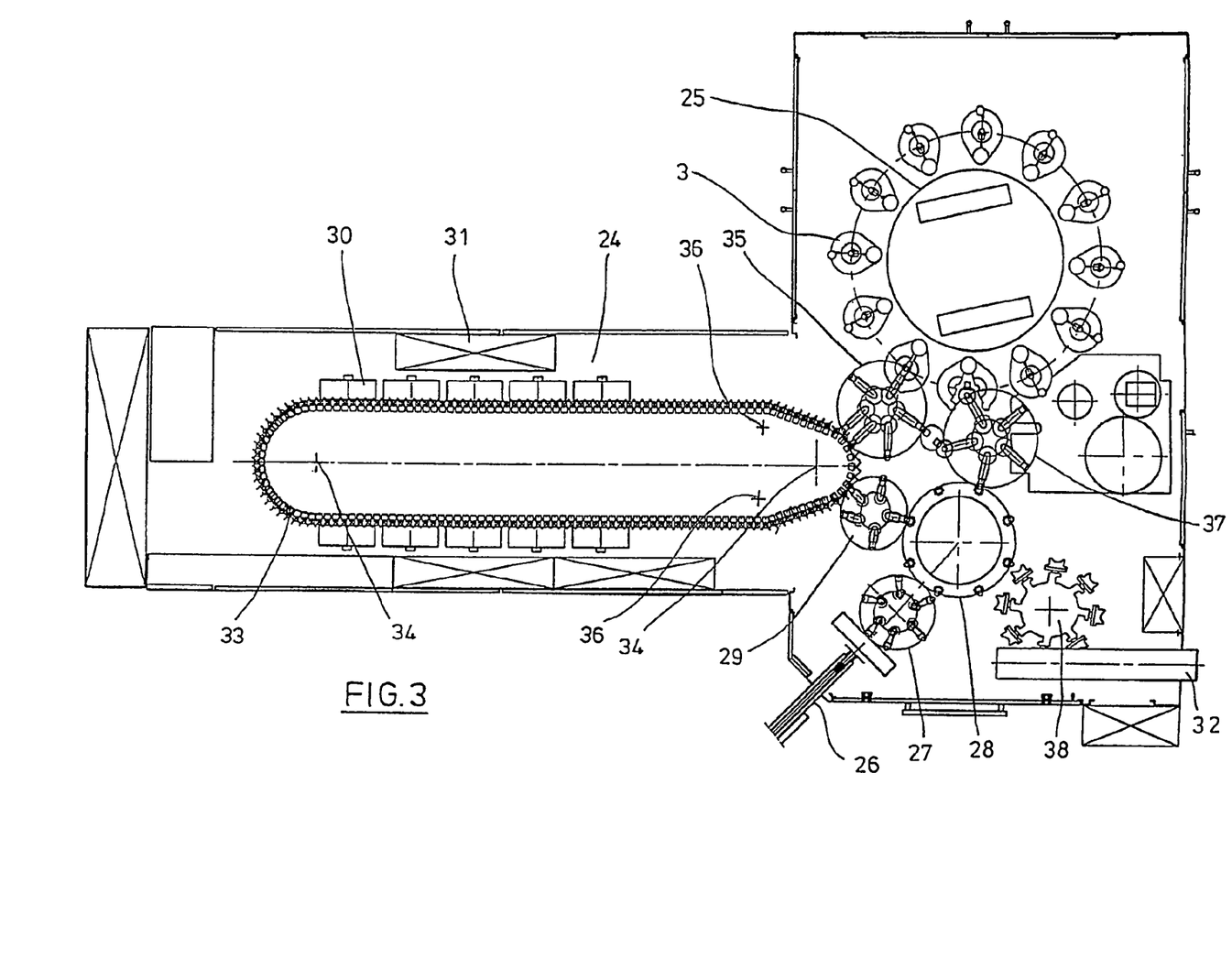
FIG. 3 shows a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
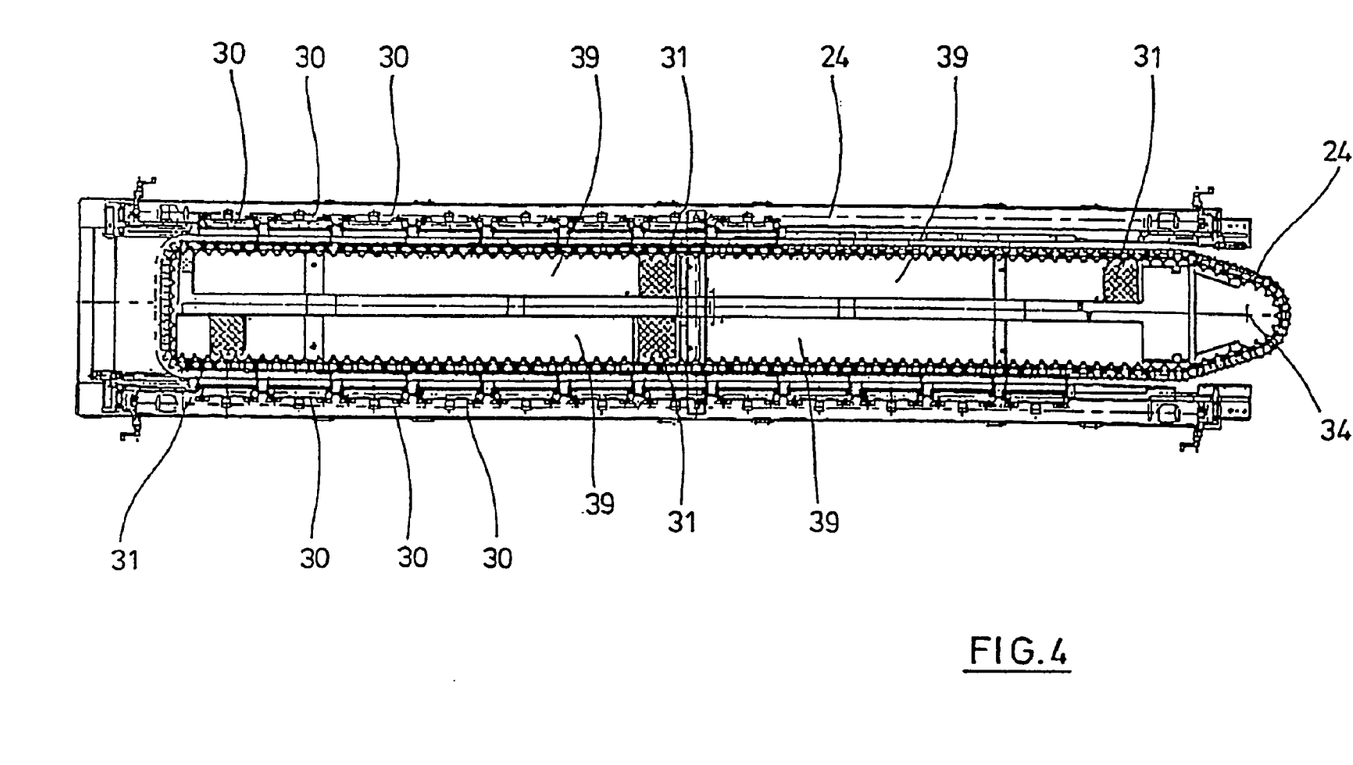
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
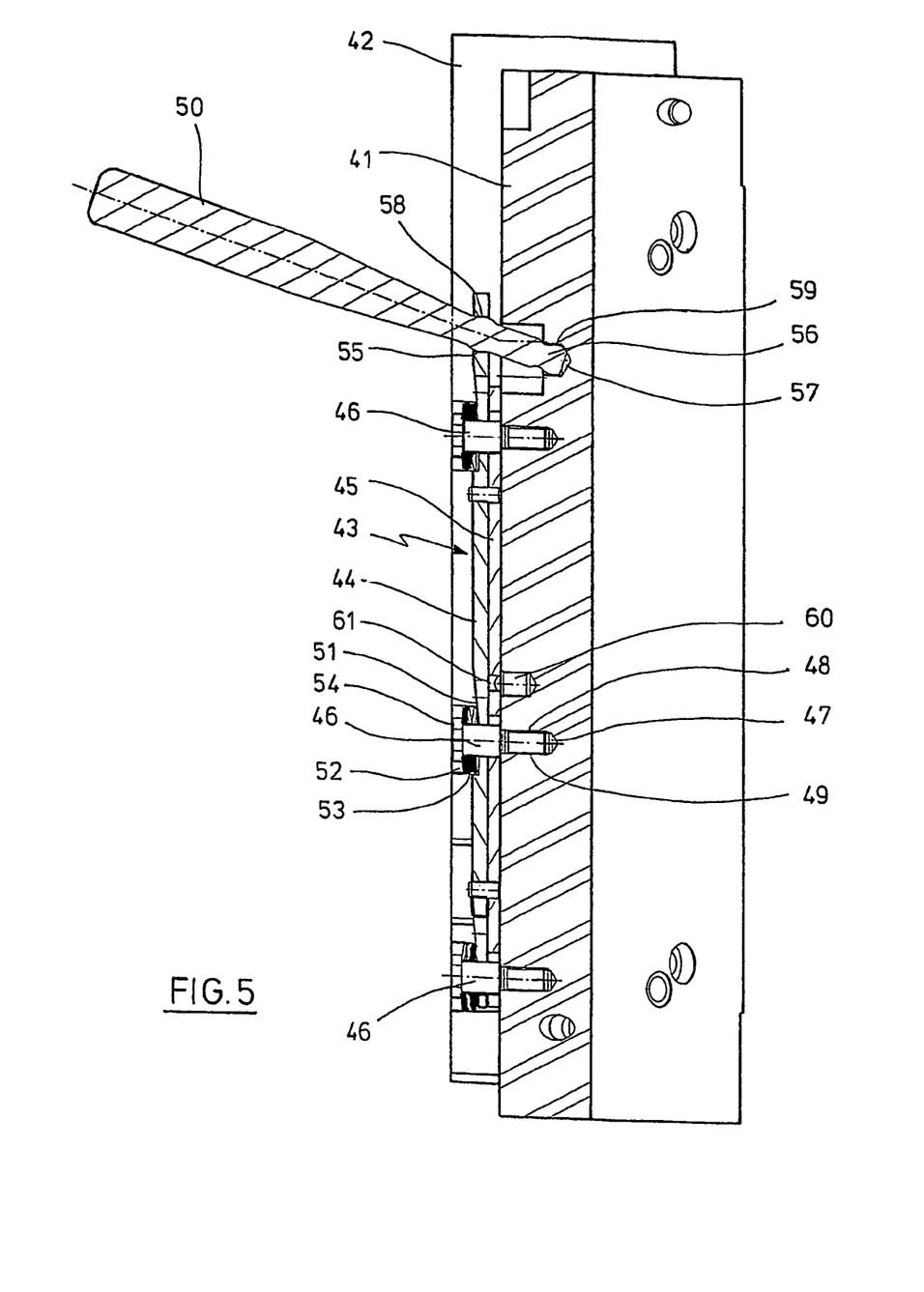
FIG. 5 shows a partial view of a longitudinal section through a blowing station in the vicinity of the locking mechanism in the unlocked state.

FIG. 5 shows a cross section through a blow mold segment 42 supported by a support element 41. The support element 43 can be one of the mold supports 19, 20 according to FIG. 1, and the blow mold segment 42 can be realized as one of the mold halves 5, 6 according to FIG. 1. In accordance with another specific embodiment of the invention, the blow mold segment 42 is realized as a mold inner shell, which is supported by a support element 41 that is realized as a mold outer shell.

A locking element 43 is used to releasably mount the blow mold segment 42 in the vicinity of the support element 41. In the embodiment shown in FIG. 5, the locking element 43 consists of a positioning element 42 and a base element 45, which is located at least in certain areas between the positioning element 44 and the support element 41.

Both the positioning element 44 and the base element 45 are movably supported in the vicinity of guide elements 46. The embodiment shown in FIG. 5 uses three guide elements 46 in the form of bolts. The guide elements 46 have external threads 47 that allows them to be screwed into internal threads 48 located in mounting recesses 49. The mounting recesses 49 can be realized, for example, as drill holes in the support element 41.

FIG. 5 shows a released state of the locking element 43. To allow it to be released, the locking element 43 has been moved with the use of a lever 50 in such a way that wedge-shaped surfaces 51 of the positioning element 44 are displaced relative to contact surfaces 52. In the embodiment shown in FIG. 5, springs 53 are mounted between the contact surfaces 52 and the wedge-shaped surfaces 51. The springs 53 allow the presetting of well-defined tension and are helpful for easy release of the locking element 43. In the illustrated embodiment, the springs 53 are designed as disk springs, and the contact surfaces 52 are located in the vicinity of bolt heads of the guide elements 46.

The lever 50 passes through an opening 55 in the positioning element 44 and has an end piece 56 that extends into a recess 57 of the support element 41. To promote low-friction movement, the lever 50 is guided over rounded rolling surfaces 58, 59 in the vicinity of the openings 55, 57. FIG. 5 shows the lever 50 pushed into its "up" position, which results in upward positioning of the positioning element 44. In the embodiment illustrated in FIG. 5, the lever 50 is located in a vertically upper position of the positioning element 40. In principle, however, the device can also be located in a vertically lower region of the positioning element 40 or in any other, sufficiently accessible region between the two ends of the positioning element 44.

To prevent unintentional displacement of the locking element 43 in the released state shown in FIG. 5, a catch element 60 is used. In the illustrated embodiment, the catch element 60 is held by the support element 41 and engages a recess 61 of the base element 55. In principle, it is also possible to position the catch element 60 in the base element 45 and to place the opposing element (recess) in the support element 41. The catch element 60 can be realized, for example, as a spring-loaded ball.

Figure 6:
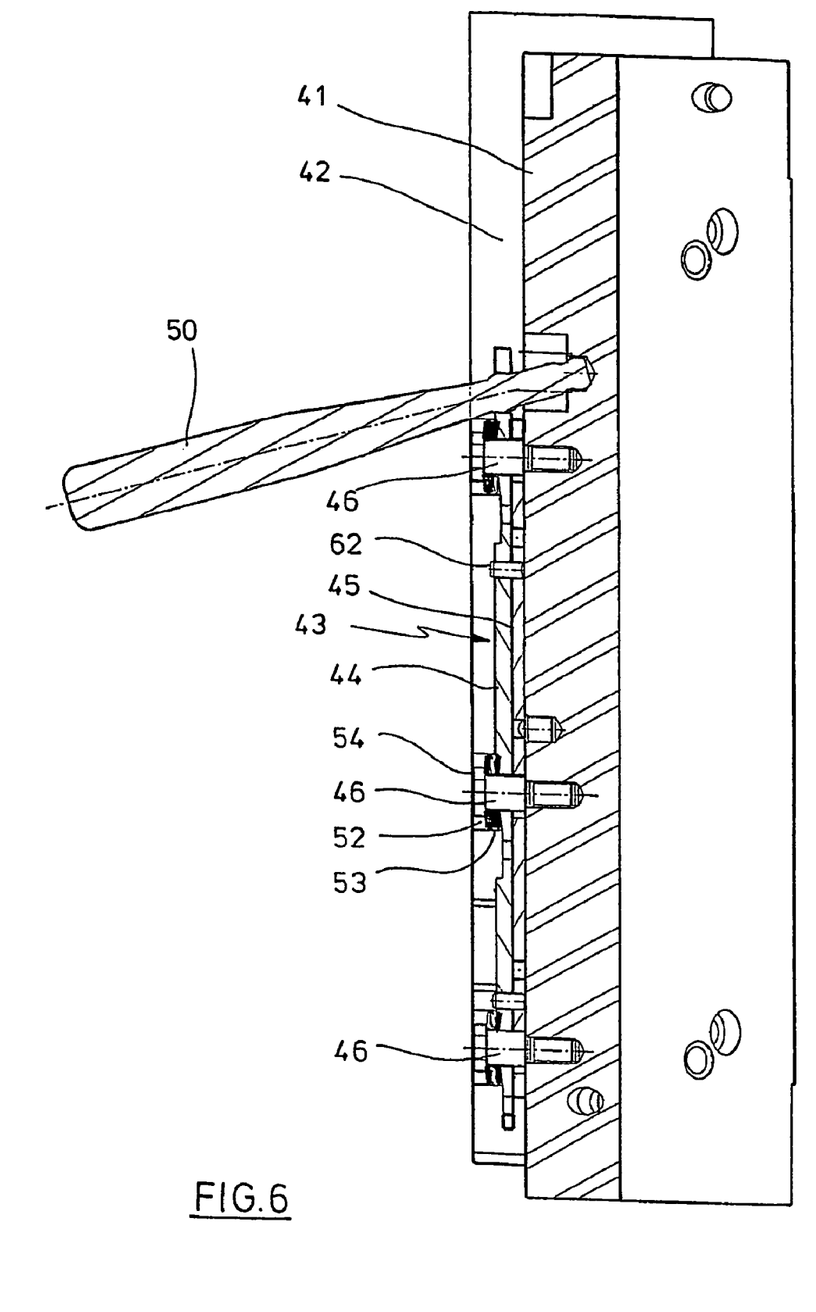
FIG. 6 shows the locking mechanism according to FIG. 5 in the locked state.

FIG. 6 shows the device according to FIG. 5 with the locking mechanism 43 in a locked state. Compared to the device in FIG. 5, the lever 50 has been pushed downward, thereby causing a displacement of the positioning element 44. This causes tensioning of the springs 53 between the wedge-shaped surfaces 51 and the contact surfaces 52.

In addition to the displacement of the positioning element 44, a displacement of the base element 45 also occurs. This is accomplished by connecting elements 62, which engage the elements 43, 44 and connect these elements with each other with play.

Figure 7:
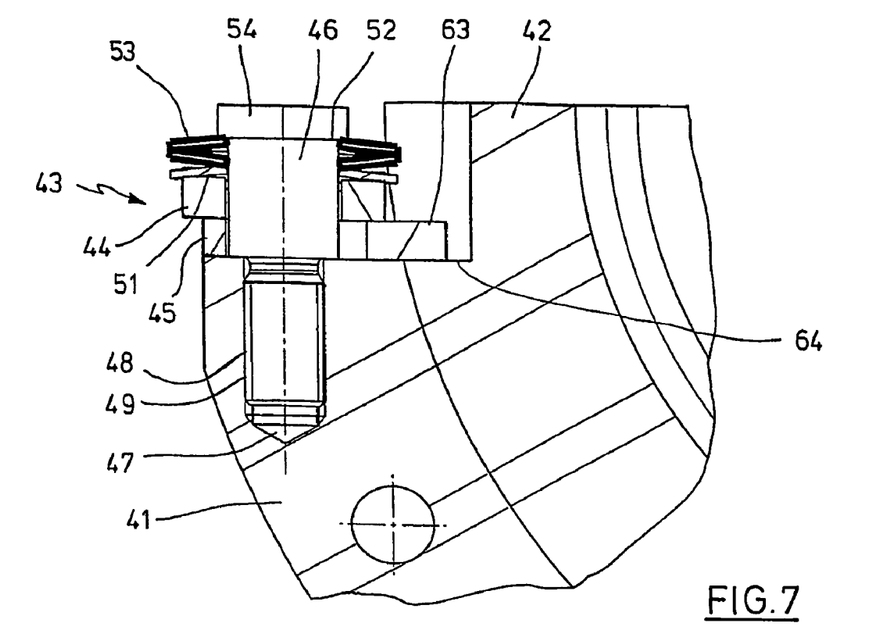
FIG. 7 shows a magnified partial view of a cross section through the locking mechanism in the locked state.
Figure 8:
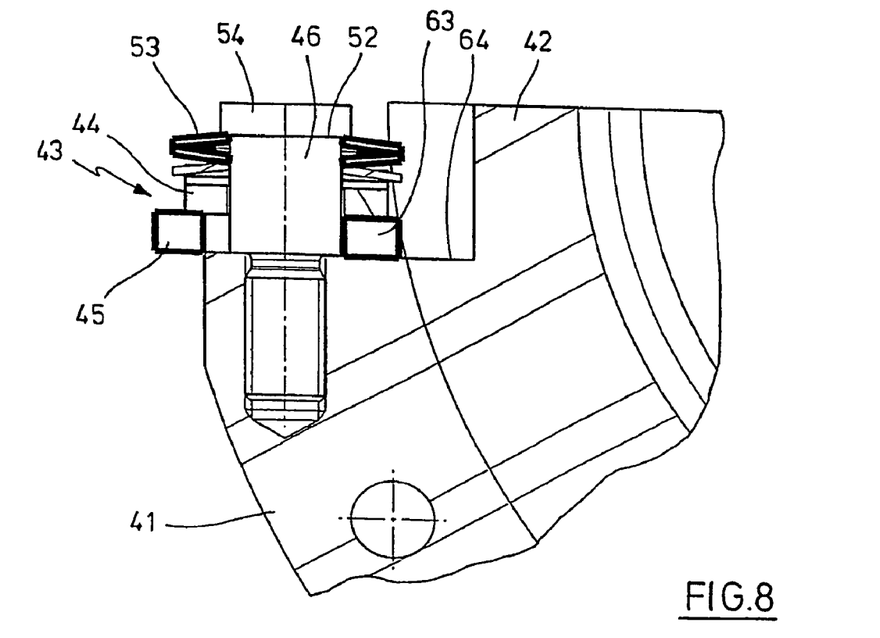
FIG. 8 shows a view that corresponds to FIG. 7, with the locking mechanism in the released state.

The principle of operation of the both positive-locking and frictional connection is explained in greater detail in FIGS. 7 and 8. FIG. 7 shows a cross section through the device in a locked state. The base element 47 is supported here with locking clips 63 over mounting surfaces 64 of the blow mold segment 42 and produces a positive-locking connection. In addition, the springs 53 provide tension via the wedge-shaped surfaces 51 and produce a frictional connection.

According to the view in FIG. 8, after the unlocking has been carried out, the base element 45 is displaced in a direction opposite the mounting surface 64, and the locking clips 63 thus release the mounting surfaces 64. In addition, the spring 53 is relaxed, so that the frictional connection is removed. In the unlocked state illustrated in FIG. 8, the blow mold segment 42 can thus be removed from the support element 41.

Figure 9:
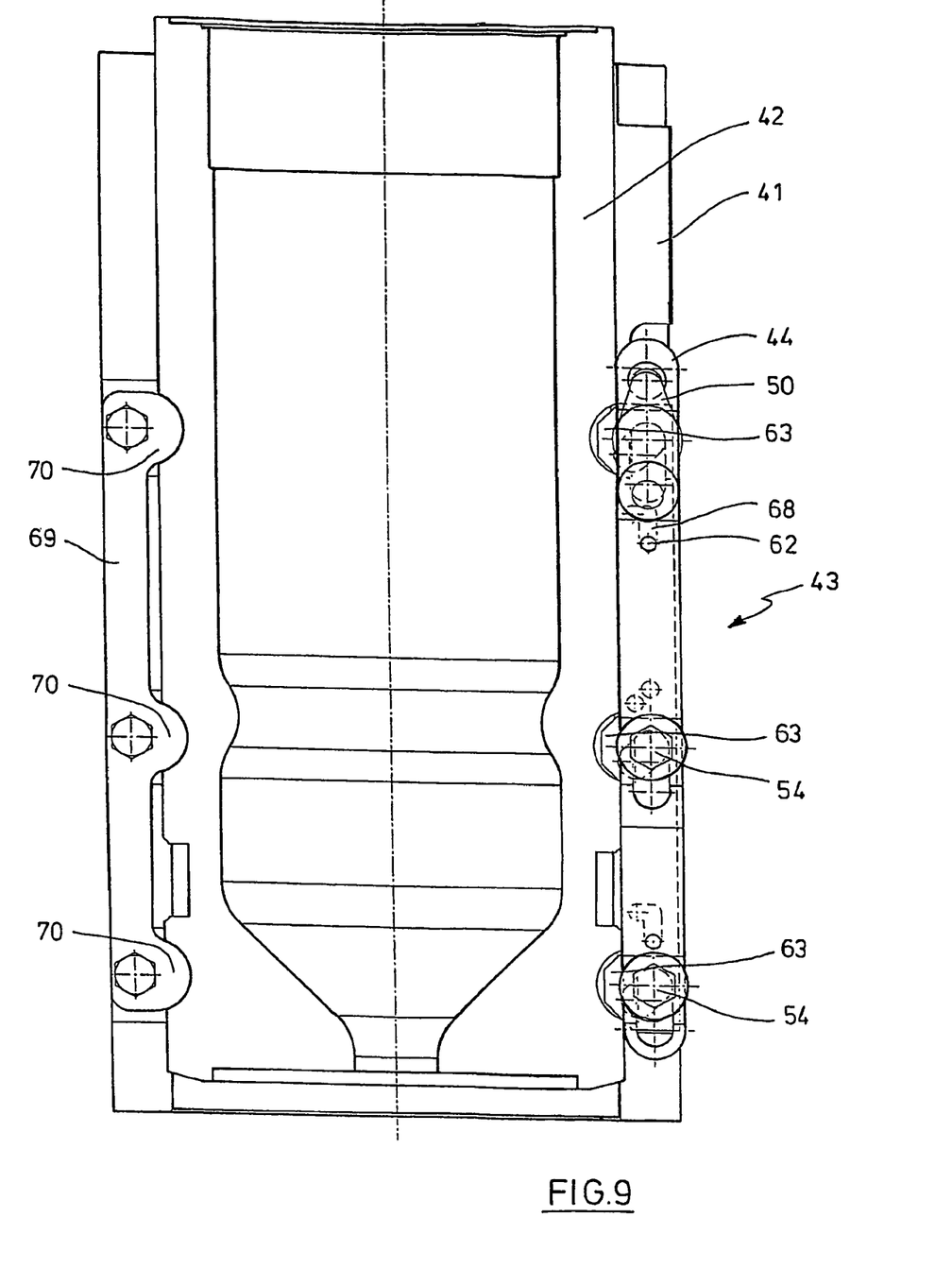
FIG. 9 shows a side view of a blow mold segment in the locked state and held in place in the vicinity of the support element by the locking mechanism.

FIG. 9 shows another view that illustrates the coupling between the positioning element 44 and the base element 45. The drawing shows that the positioning element 44 is supported on the guide elements 46 by slots 65. The base element 45 is supported on the guide elements by diagonal holes 66. The diagonal holes 66 are also designed as slots but have a different spatial orientation from the slots 65. The slots 65 extend essentially in the direction of a longitudinal axis 67 of the positioning element 44, while the diagonal slots 66 run obliquely to this longitudinal axis 67. FIG. 9 also illustrates that the connecting elements 62 are supported by the base element 45 and fit into guide slots 68 in the positioning element 44. In principle, it is also possible to exchange the locations of the guide slots 68 and the connecting elements 62.

The guide slots 68 are essentially L-shaped, with the longer leg of the guide slot running along the longitudinal axis 67 and the shorter leg extending transversely to the longitudinal axis 67. In this connection, the shorter leg of the guide slot 68, starting from the longer leg, extends in the direction of the blow mold segment 42.

FIG. 9 also shows that the blow mold segment 42 is held in place on two sides in the vicinity of the support element 41. It is held in place on one side with the use of the locking element 43 and on the other side with the use of a clamping clip 69. The clamping clip 69 has projections 70 that overlap the blow mold segment 42 and likewise provides positive-locking mounting in this way. After the locking element 43 has been released, the blow mold segment 42 can be pulled out beneath the projections 70 without loosening the clamping clip 69.

Figure 10:
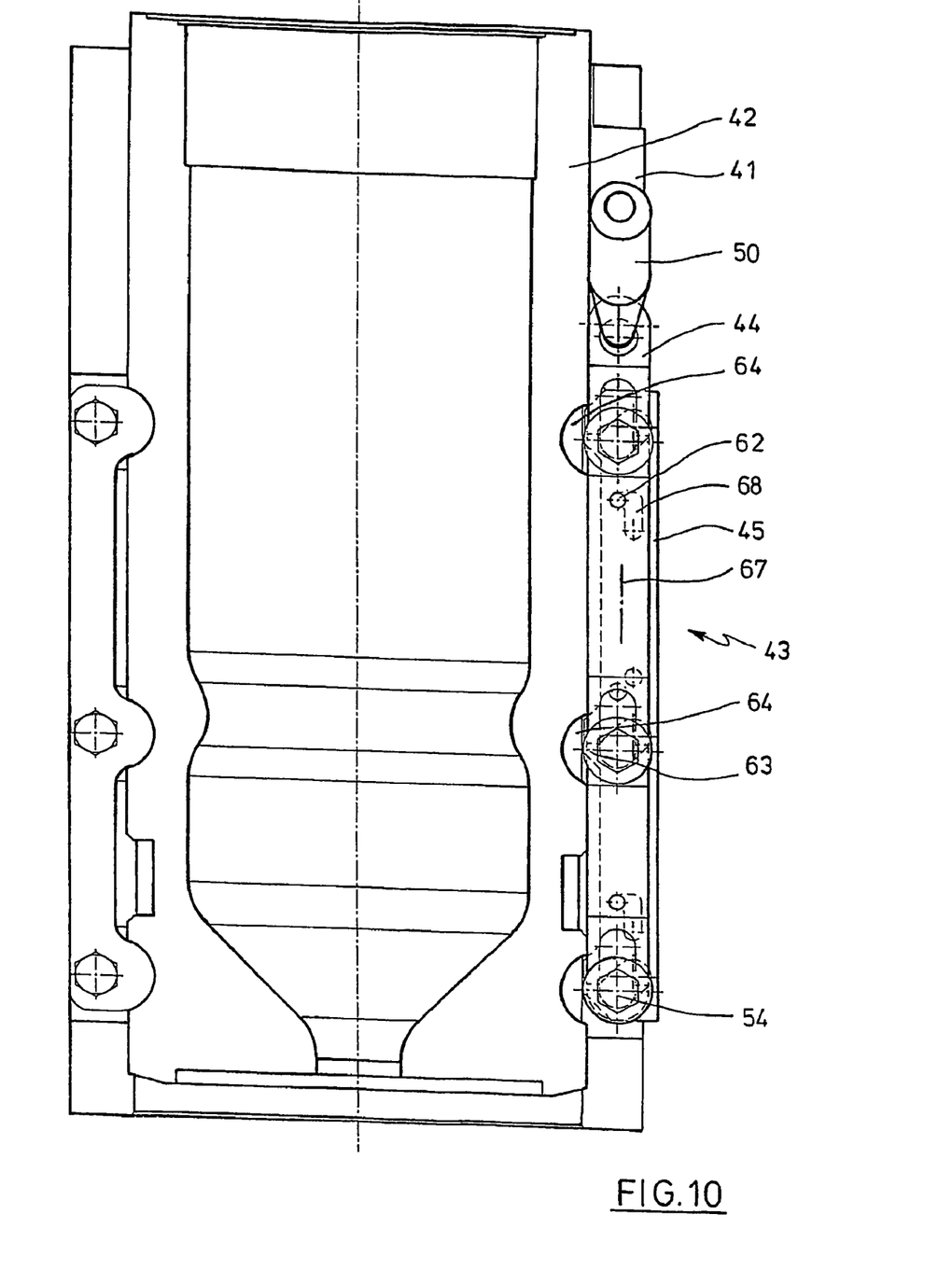
FIG. 10 shows a view that corresponds to FIG. 9, with the locking mechanism in the released state.

According to the drawing in FIG. 10, the lever 50 has been pushed upward, thereby causing the positioning element 44 also to be moved upward. Due to the coupling between the positioning element 44 and the base element 45, when the connecting element 62 runs freely a distance predetermined by the length of the guide slot 68 and stops at the upper edge of the guide slot 68, it carries the base element 45 along with it in the direction of movement of the positioning element 44 and thus in the direction of the longitudinal axis 67. As a result of mechanical coupling, which will be explained in greater detail below, transverse positioning of the base element 45 additionally takes place transversely to the longitudinal axis 67 in a direction away from the blow mold segment 42 in such a way that the mounting surfaces 64 of the blow mold segment 42 are no longer overlapped by the locking clips 63. In this state, it is possible to remove the blow mold segment 42 from the support element 41.

Figure 11:
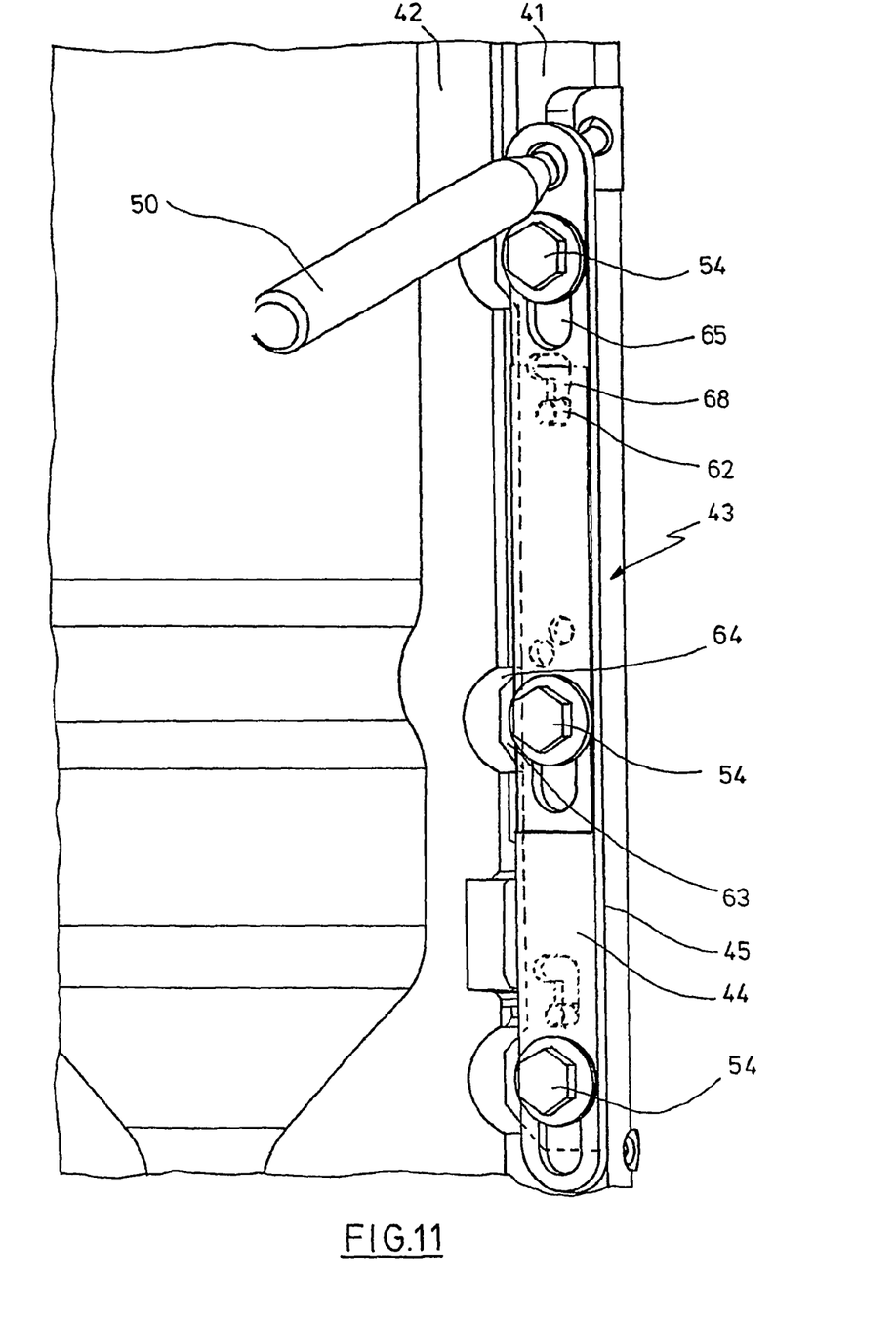
FIG. 11 shows a perspective view similar to FIG. 9, with the locking mechanism in the locked state.

FIG. 11 shows a drawing similar to FIG. 9 but in a perspective view. The locking element 63 has been moved by the lever 50 into the locked position, so that the locking clips 63 overlap the mounting surfaces 64 to produce a positive-locking connection.

Figure 12:
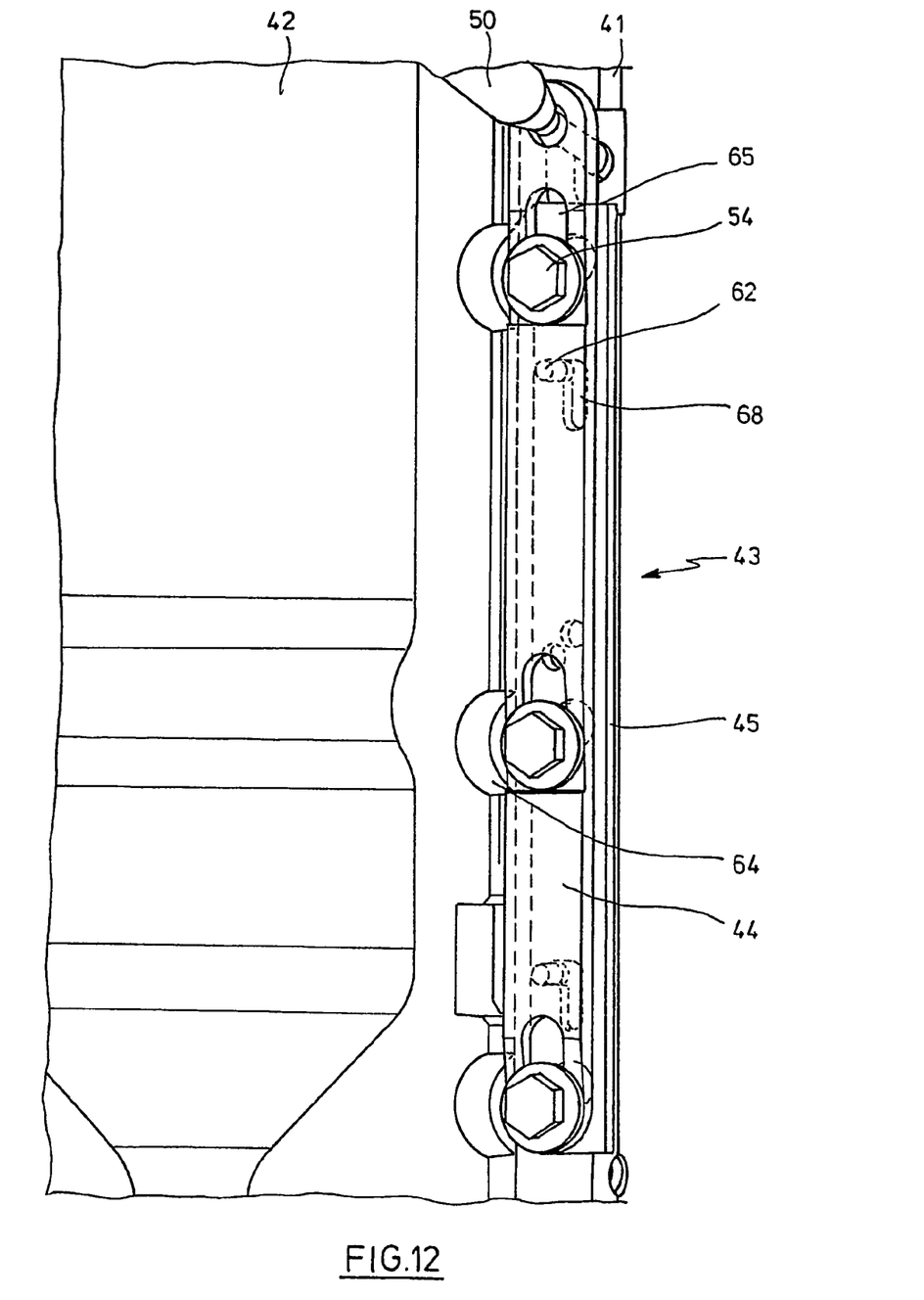
FIG. 12 shows a view similar to FIG. 11, with the locking mechanism in the released state.

FIG. 12 shows the device according to FIG. 11 after the lever 50 has been pushed up. This causes the locking element 43 to be pushed upward far enough for the locking clips 63 to release the mounting surfaces 64. Within the L-shaped guide slot 68, the connecting element 62 is located in the end region of the short leg of the L-shaped profile.

Figure 13:
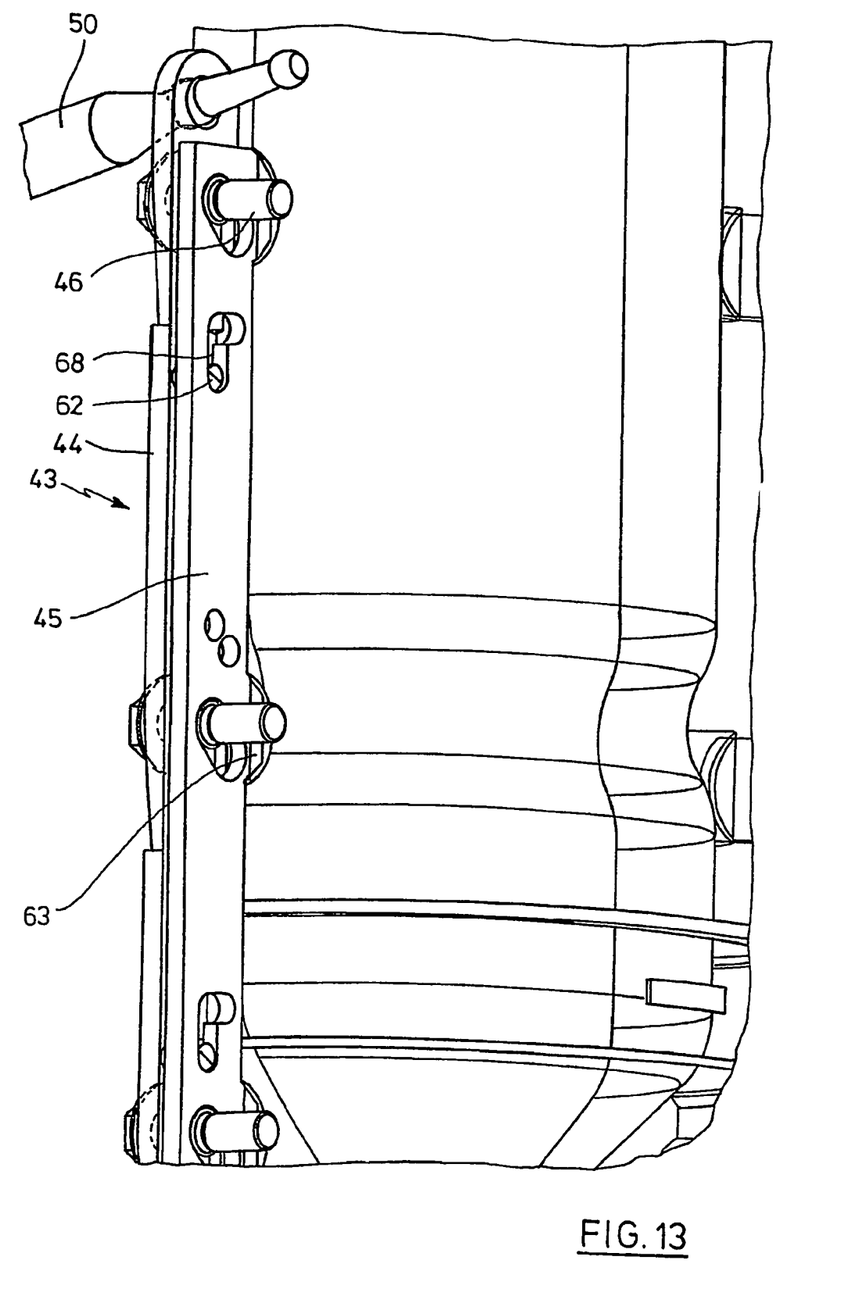
FIG. 13 shows a view of the locking mechanism in the locked state shown in FIG. 11 with an oblique direction of view from the rear.

FIG. 13 shows another perspective view of the locking element 43 in the locked state according to FIG. 11 but in this case as seen looking out from the blowing station 3. To make clear the arrangement of the positioning element 44 and the base element 45, the respective support element 41 and the blow mold segment 42 are not shown. Only the corresponding components of the opposing blow mold half are shown.

FIG. 13 illustrates, in particular, that the positioning element 44 and the base element 45 are supported with their respective slots 65 and diagonal holes 66 together on the associated guide elements 46. FIG. 13 shows an operating state in which both the positioning element 44 and the base element 45 have been moved into a lowered position by the lever 50, and the locking clips 63 have been displaced in the direction of the blow mold segments 42 that are to be held in place.

Figure 14:
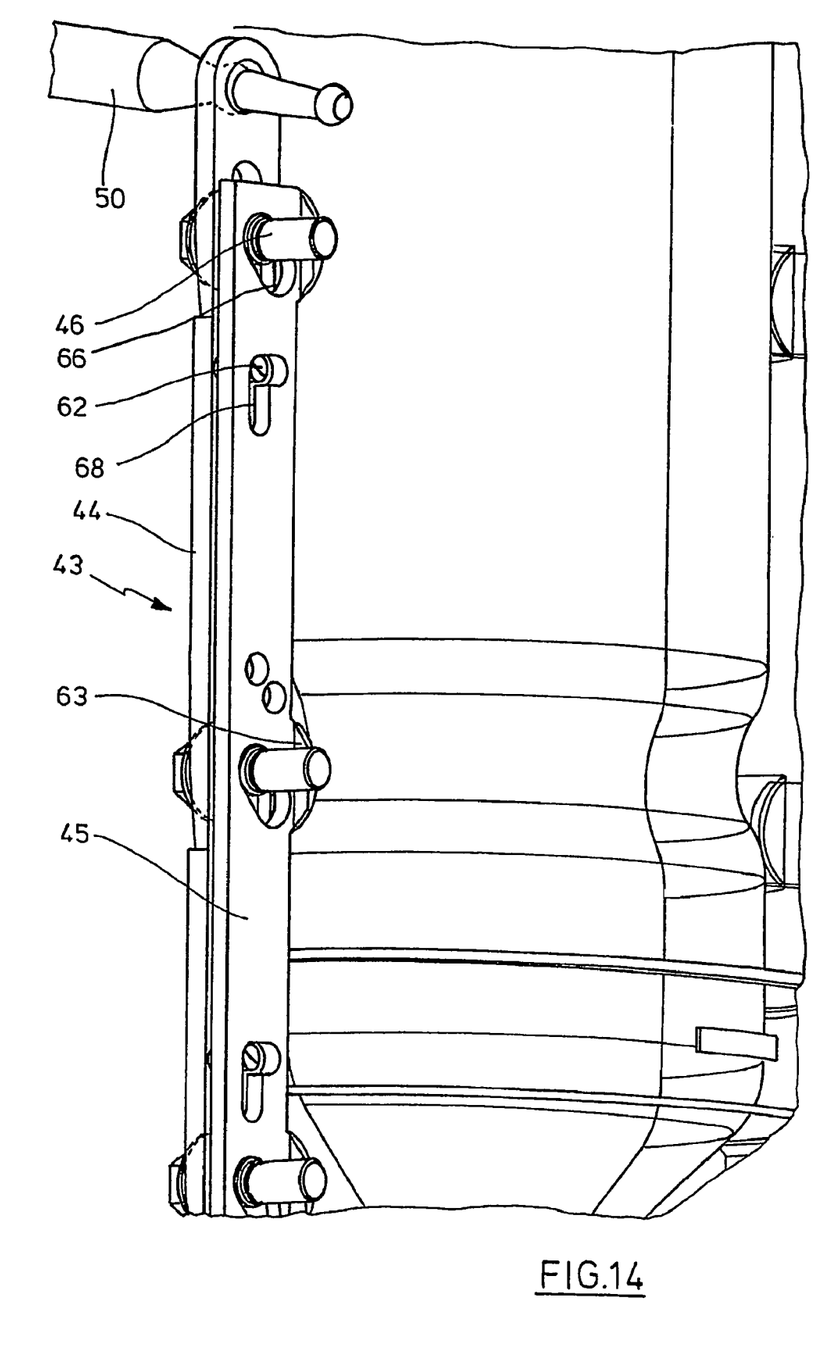
FIG. 14 shows a view that corresponds to FIG. 13 in a state in which the frictional connection has already been removed but not the positive-locking connection.

FIG. 14 shows an operating state in which the positioning element 44 has been lifted sufficiently far by the lever 50 that the frictional connection has already been released. However, the positive-locking connection is still present. To arrive in this state, the positioning element 44 was lifted to the point that the connecting element 62 just reached the upper limit of the guide slot 68. A change in the position of the base element 45 from its position in FIG. 13 has not yet occurred. The locking clips 63 are thus still in their original position. The slots 65 of the positioning element 44, which cannot be seen in FIG. 14 but are visible, for example, in FIG. 12, are positioned in such a way in FIG. 14 that the guide elements 46 are located more or less in the middle of the slots 65.

Figure 15:
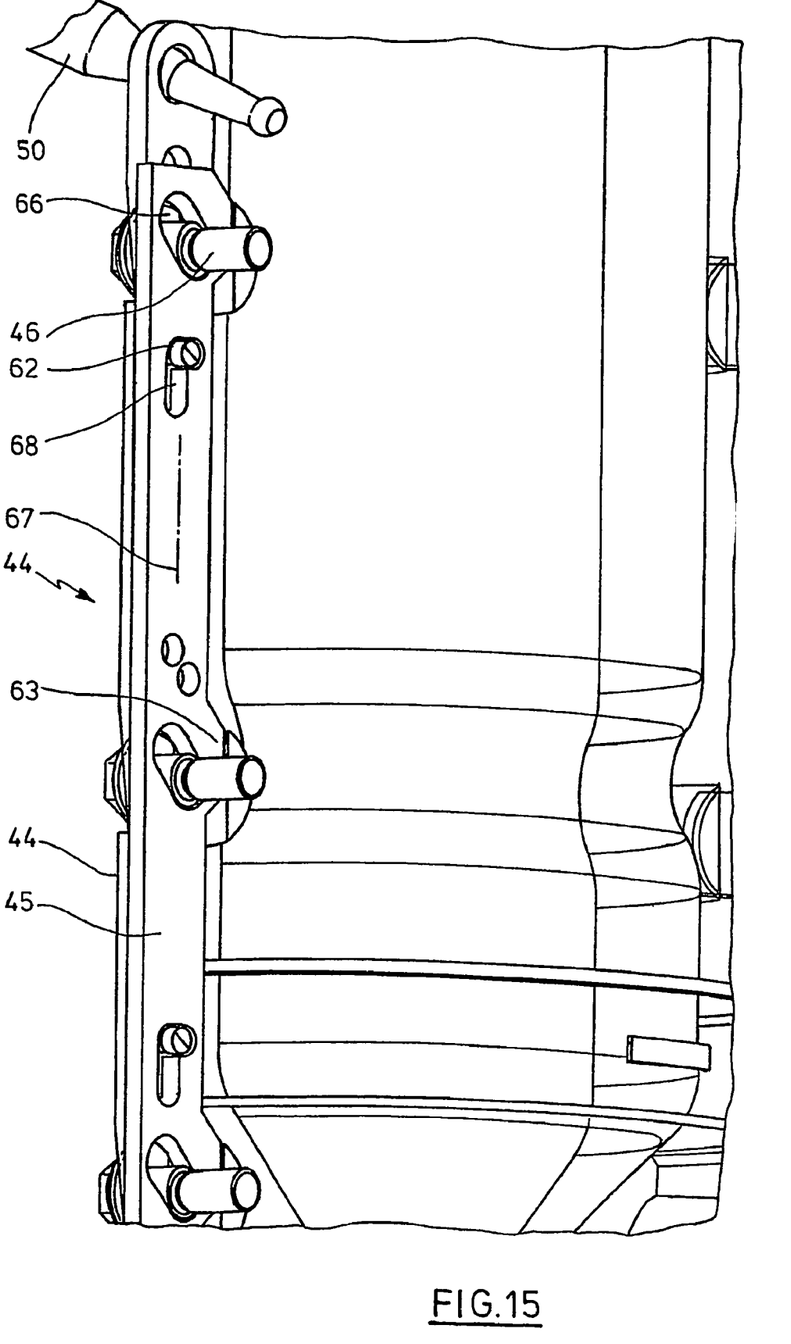
FIG. 15 shows a view similar to FIGS. 13 and 14 in a completely released state of the locking mechanism.

In the final position shown in FIG. 15, the positioning element 44 has been lifted farther by means of the lever 50. Since the connecting element 62 was already resting on the upper edge of the guide slot 68 in the drawing according to FIG. 14, the additional lifting of the positioning element 44 also results in a displacement of the base element 45. Since the base element is supported on the guide element 46 by its diagonal slot 66, the oblique orientation of the diagonal slot 66 relative to the longitudinal axis 67 causes not only translation of the base element 45 in the direction of the longitudinal axis 67 but also transverse movement of the base element 45. The transverse movement causes the base element 45 to be displaced in a direction away from the blow mold segment 42, and as a result, the locking clips 62 release the associated mounting surfaces 64 of the blow mold segments 42.

The invention claimed is:

1. A device for mounting a blow mold segment in a blowing station, which is provided with a support element for the blow mold segment and in which the blow mold segment can be detachably held in place in the vicinity of the support element by at least one locking element, wherein the locking element (43) is designed to hold the blow mold segment in place with both positive locking and frictional locking, wherein the locking element (43) holds the blow mold segment (42) in place with at least two locking clips (63) that are rigidly connected with each other by a common base element (45), wherein the locking element (43) comprises the base element (45) together with a positioning element (44), wherein the blow mold segment (42) is designed as an inner shell of the mold and the support element (41) is designed as an outer shell of the mold, wherein the blow mold segment (42) is fixable on two sides in a vicinity of the support element (41) and the locking element (43) is positionable transversely to a longitudinal axis (67).

2. A device in accordance with claim 1, wherein the base element (45) and a guide element (46) are connected with each other with play by at least one connecting element (62).

3. A device in accordance with claim 2, wherein the connecting element (62) is designed as a projection that fits into a guide slot (68).

4. A device in accordance with claim 3, wherein the connecting element (62) is designed as a pin.

5. A device in accordance with claim 3, wherein the guide slot (68) has an essentially L-shaped configuration.

6. A device in accordance with claim 1, wherein the base element (45) and the positioning element (44) are supported on at least one common guide element (46).

7. A device in accordance with claim 6, wherein the positioning element (44) has a slot (65) by which it is supported on the guide element (46).

8. A device in accordance with claim 6, wherein the base element (45) has a diagonal slot (66) by which it is supported on the guide element (46) and that the longitudinal direction of the diagonal slot (66) is arranged. obliquely to a longitudinal axis (67) of the positioning element (44).

9. A device in accordance with claim 1, wherein the locking element (43) can be positioned by a lever (50).

10. A device in accordance with claim 9, wherein the lever (50) is mounted as a rocker arm.

11. A device in accordance with claim 9, wherein the lever (50) is designed to be separable from the locking element (43).

12. A device in accordance with claim 9, wherein the lever (50) passes through .an opening (55) in the positioning element (44) and has an end piece (56) by which it is supported in a recess (57) of the support element (41).

13. A device in accordance with claim 1, wherein the base element (45) and the positioning element (44) can be tensioned relative to each other by at least one spring (53).

14. A device in accordance with claim 1, wherein the locking element (43) can be fixed in place in its unlocked state by at least one catch.

15. A device in accordance with claim 1, wherein the positioning element (44) is mounted in a way that allows it to be tensioned relative to the base element (45) by at least one wedge-shaped surface (51).

16. A device in accordance with claim 1, wherein the blow mold segment (42) and the support element (41) are connected with each other in two regions on opposite sides of each other and that the first of the two connections is formed by the locking element (43) and the second of the two connections is formed by at least one rigidly mounted clamping clip (69).

17. A blowing station for blow molding containers made of a thermoplastic material, which blowing station has at least one blow mold segment, wherein the blow mold segment is mounted by a device in accordance with claim 1.

18. A blow-molding machine with at least one blowing station, which has at least one blow mold segment, wherein the blow mold segment is mounted by a device in accordance with claim 1.

* * * * *